(12) United States Patent
Konishi et al.

(10) Patent No.: US 8,009,564 B2
(45) Date of Patent: Aug. 30, 2011

(54) TRANSMITTING APPARATUS AND TRANSMISSION RATE CONTROL METHOD

(75) Inventors: Kazunobu Konishi, Tokyo (JP); Eiichi Muramoto, Kanagawa (JP); Takahiro Yoneda, Tokyo (JP)

(73) Assignee: Panasonic Corporation, Osaka (JP)

( * ) Notice: Subject to any disclaimer, the term of this patent is extended or adjusted under 35 U.S.C. 154(b) by 656 days.

(21) Appl. No.: 11/997,680

(22) PCT Filed: Aug. 1, 2006

(86) PCT No.: PCT/JP2006/315213
§ 371 (c)(1),
(2), (4) Date: Mar. 18, 2008

(87) PCT Pub. No.: WO2007/015482
PCT Pub. Date: Feb. 8, 2007

(65) Prior Publication Data
US 2010/0157795 A1    Jun. 24, 2010

(30) Foreign Application Priority Data

Aug. 4, 2005  (JP) ................. 2005-226466

(51) Int. Cl.
*G01R 31/08*  (2006.01)

(52) U.S. Cl. .................... 370/232; 370/230.1

(58) Field of Classification Search ............... 370/230.1, 370/232
See application file for complete search history.

(56) References Cited

U.S. PATENT DOCUMENTS

| 2001/0047423 | A1 * | 11/2001 | Shao et al. ............... 709/235 |
| 2003/0007455 | A1 * | 1/2003 | Kohzuki et al. ........... 370/230.1 |
| 2006/0168338 | A1 * | 7/2006 | Bruegl et al. ............ 709/240 |
| 2007/0002859 | A1 * | 1/2007 | Corson et al. ............ 370/390 |

OTHER PUBLICATIONS

International Search Report dated Nov. 7, 2006.
E. Muramoto, et al., "Proposal for Congestion Control Method on Sender Initiated Muticast," Matsushita Electric Industrial Co., Ltd., Oct. 2003, pp. 1-8. p. 7, Line 12.
R. Boivie, et al., "Explicit Multicast (Xcast) Basic Specification," Jul. 2005, pp. 1-33.
J. Sato, et al., "IPv6 Network Camera eno XCAST6/SICC no Tekiyo," Oct. 2005, pp. 1-3.
Y. Imai, et al., "XCAST6: Xplicit Multicast on IPv6," IEEE/IPSJ SAINT2003, Workshop 4, Jan. 2003, pp. 1-6, p. 7, Line 6.
M. Handley, et al., "TCP Friendly Rate Control (TFRC): Protocol Specification," RFC 3448, Jan. 2003, pp. 1-24, p. 7, Line 9.

* cited by examiner

*Primary Examiner* — Ricky Ngo
*Assistant Examiner* — Paul Masur
(74) *Attorney, Agent, or Firm* — Dickinson Wright PLLC

(57) ABSTRACT

In a communication of explicit multicast system used in SICC, the frequency of variation of the transmission rate is reduced to achieve a multimedia data transmission exhibiting a high quality. An available bandwidth estimating part (102) of a transmitting apparatus (100) uses feedback information, which is received by a receiving part (101) from a receiving apparatus (200), to estimate a bandwidth available to the receiving apparatus. A bandwidth correcting part (103) corrects, based on a difference in header size between a current class and an upper-order class, the estimated available bandwidth. A class deciding part (104) uses the corrected bandwidth to change the class to which the receiving apparatus belongs.

8 Claims, 6 Drawing Sheets

TRANSMITTING APPARATUS AND TRANSMISSION RATE CONTROL METHOD

TECHNICAL FIELD

The present invention relates to a transmitting apparatus that transmits high quality multimedia data such as images and speech by multicast communication.

BACKGROUND ART

Recently, with substantial development of network systems, multimedia data is more often transmitted to a plurality of receiving apparatuses belonging to the same group in, for example, television conference or network games. In this case, multicast communication is known as a communication method for effectively transmitting the same packet to all receiving apparatuses.

A transmitting apparatus classifies receiving apparatuses to which multimedia data is delivered, into small groups of about ten people, and carries out multicast communication on a per small group basis. Multicast communication schemes include the explicit multicast scheme. These schemes refer to storing destination addresses of all receiving apparatuses belonging to a group in an option header or payload of a packet as a receiver list and explicitly specifying all receiving apparatuses to which a packet is delivered, at a transmitting apparatus. Hereinafter, what is simply referred to as a "packet" in this description refers to a packet according to the explicit multicast scheme.

There is "explicit multicast 6" (hereinafter, "XCAST 6") as a typical explicit multicast scheme (see Non-Patent Document 1).

FIG. 6 shows the header format according to XCAST 6. Further, this XCAST 6 refers to carrying out communication using IPv6 as an IP address.

In FIG. 6, the source address of the packet is written in source address 602 in IPv6 header 601, and a destination address, which is a transmission destination, is written in destination address 603.

XCAST header (XCAST Hdr) 604 is formed with IPv6 header (IPv6Hdr) 605 and routing header (RoutingHdr) 606. The source address of the packet is stored in source address 607 of IPv6 header 605, and a multicast address given to XCAST6, for example, ff05::10, is stored in destination address 608.

All destination address 0 to n (609), which are transmission destinations of multicast, and destination port 0 to n (610) are stored in routing header 606.

The packet distribution method according to the explicit multicast scheme will be described in detail.

When receiving a packet, a router supporting the explicit multicast scheme searches the unicast routing table for all destination addresses stored in routing header 606 of the packet and check the transmission interface matching each destination address. Further, when the packet needs to be outputted to a plurality of output interfaces, the router duplicates packets equaling the number of transmission interfaces. At this time, the router deletes destination addresses other than destination addresses of receiving apparatuses included in the transmission interface from routing header 606 of the packet or adds a mark showing that delivery is completed. Further, the router rewrites destination address 603 written in the IP header to a destination address of a receiving apparatus to which the packet is not yet delivered.

On the other hand, the router that does not support the explicit multicast scheme searches the unicast routing table from the destination address written in the IF header without referring to destination address 605 stored in the packet. Then, similar to normal unicast communication, the router transmits the packet. That is the router that does not support the explicit multicast scheme does not carry out multicast communication. However, when a receiving apparatus that supports the explicit multicast scheme receives this packet, the receiving apparatus refers to a receiver list stored in the XCAST header. Further, when the receiver list includes destination addresses to which the packet is not yet delivered, the receiving apparatus duplicates packets, rewrites destination address 603 of the IP header to the destination addresses to which the packet is not delivered, and transmits the packet.

According to the above method, in the explicit multicast scheme, even if all routers on the route do not support the explicit multicast scheme, the packet could be delivered to all receiving apparatuses.

However, when multimedia data is transmitted by the explicit multicast scheme, if network congestion occurs, a receiving apparatus is not able to receive multimedia data stably, and so quality of images and speech deteriorates significantly. For this reason, it is important to avoid congestion. However, in the explicit multicast scheme, transmission rate control is not defined, and so, even if congestion occurs, it is not possible to avoid congestion by controlling a transmission rate.

TFRC (TCP Friendly Rate Control) that uses feedback information is known as a transmission rate controlling method (see Non-Patent Document 2). This "TFRC" refers to increasing the transmission rate until packet loss occurs and decreasing the transmission rate when packet loss occurs. By this means, the receiving apparatus is able to carry out transmission at a suitable transmission rate.

Then, transmission rate control utilizing TFRC to communication that employs the explicit multicast scheme is studied, and, consequently, SICC (Sender Initiated Congestion Control) is proposed (see Non-Patent Document 3).

FIG. 7 is a packet delivery diagram showing operation of SICC.

In FIG. 7, a transmitting apparatus sets in advance a plurality of classes to which different transmission rates are assigned. According to SICC, upper limit B (bps) of the transmission rate is set and three classes including B/2 class and B/4 class (1/1 Class, 1/2 Class and 1/4 Class, respectively), are provided by decreasing upper limit B by ½ and B/2 by ½. The transmitting apparatus classifies receiving apparatuses into classes and transmits on a per class basis a packet that stores in the header the destination addresses of receiving apparatuses belonging to each class.

To which class a receiving apparatus belongs is determined by the available bandwidth for each receiving apparatus. That is, according to the TFRC requirement, the transmitting apparatus receives information fed back from each receiving apparatus to the transmitting apparatus, including the loss event rate, the time a received packet is transmitted from the transmitting apparatus and the effective rate at which the receiving apparatus is able to receive the packet and estimates by equation 1 the available band for each receiving apparatus based on these items of feedback information. Then, based on the estimated available bandwidth for receiving apparatuses, the transmitting apparatus classifies receiving apparatuses into classes in which transmission rates are set such that the available band can be utilized at maximum.

$$X = \frac{8s}{R\sqrt{2bp/3} + \text{T\_RTO}(3 \times \sqrt{3bp/8}) \times p \times (1 + 32p^2)} \quad \text{(Equation 1)}$$

Here, X is the available bandwidth (bps), R is the round-trip time (second), p is the loss event rate, is the packet size (byte) and T_RTO is the timeout value (=4×R) of TCP.

Further, the round-trip time used in equation 1 is determined by transmission source transmission time included in feedback information and the time a reception report packet is received.

Further, similar to TFRC, the processing of classifying receiving apparatuses into classes is carried out by the transmitting apparatus each time feedback information is received from receiving apparatuses, so that it is possible to dynamically classify receiving apparatuses into classes suitable for available bandwidth according to network conditions. In this way, each receiving apparatus is classified into either one class and the transmitting apparatus transmits a packet on a per class basis, so that it is possible to realize transmission rate control matching the network condition of each receiving apparatus.

Non-Patent Document 1: Y. Imai, M. Shin and Y. Kim, "XCAST6: eXplict Multicast on IPv6," IEEE/IPSJ SAINT2003 Workshop 4, IPv6 and Applications, Orland, January, 2003.

Non-Patent Document 2: M. Handley et al., "TCP Friendly Rate Control (TFRC): Protocol Specification," RFC 3448, Internet Non-Patent Document 3: "Proposal for Congestion Control Method on Sender Initiated Multicast," Eiichi Muramoto, Takahiro Yoneda, Fumiaki Suzuki, Yoshihiro Suzuki, Atsushi Nakamura, Internet conference 2003 memoir, pp. 5 to 10, October 2003.0

DISCLOSURE OF INVENTION

Problems to be Solved by the Invention

However, according to the explicit multicast scheme, the number of destination addresses to be stored in the header changes depending on the number of receiving apparatuses to which the packet is delivered, and so the packet size changes. Then, the practical data transmission rate changes. For this reason, when the transmitting apparatus changes the class of a receiving apparatus based on the available bandwidth estimated using feedback information from the receiving apparatus, if the number of receiving apparatuses that belong to the class after the change is equal to or more than the number of the receiving apparatuses in the class before the change, the packet size increases after the change, and so the effective rate for the class after the change becomes higher than the actual effective rate. In this way, the effective rate for data communication from the transmitting apparatus to the receiving apparatus after the change is likely to exceed the available bandwidth for the receiving apparatus.

For example, the number of receiving apparatuses in a class where the transmission rate is one level higher (hereinafter, the "upper class") is equal to or more than the number of receiving apparatuses in a class (hereinafter, the "current class") to which the receiving apparatus currently belongs.

In this case, when the class of the receiving apparatus changes from the current class to an upper class, the header size for the upper class increases more than the header size for the current class and the actual effective rate for the upper class becomes higher than the effective rate for the current class. For this reason, the effective rate for the upper class is likely to exceed the available bandwidth for the receiving apparatus.

When the transmitting apparatus transmits a packet at an effective rate exceeding the available bandwidth for the receiving apparatus, congestion occurs, and, consequently, packet loss occurs and the loss event rate measured by the receiving apparatus increases. By so doing, the transmitting apparatus estimates the available bandwidth for the receiving apparatus lower and so the class to which the receiving apparatus belongs needs to be changed to a class of a lower transmission rate.

In this way, even when the class of a receiving apparatus is changed to an upper class of a higher transmission rate, the class needs to be lowered soon, and so the class is changed frequently. As a result, the receiving apparatus has problems of changing the frame rate for transmitted images frequently and causing image quality deterioration.

In communication according to the explicit multicast scheme employed in SICC, the present invention provides a transmitting apparatus that is able to reduce the frequency of changing the transmission rate and transmit high quality multimedia data.

Means for Solving the Problem

When the available bandwidth is estimated using feedback information received frame receiving apparatus, the transmitting apparatus according to the present invention corrects the bandwidth estimated based on the header size difference between the current class, to which the receiving apparatus belongs, and an upper class. Then, the transmitting apparatus determines the class to which the receiving apparatus belongs using the corrected bandwidth.

By this means, the transmitting apparatus predicts the influence of the number of receiving apparatuses in an upper class, so that it is possible to prevent changing the class of the receiving apparatus to an upper class where the transmission rate for the receiving apparatus exceeds the available bandwidth for the receiving apparatus. For this reason, the transmitting apparatus does not change the class soon, to which the receiving apparatus belongs, to a lower class, so that it is possible to prevent the frequency of changing the transmission rate.

The transmitting apparatus according to the present invention with a function for transmitting to a plurality of receiving apparatuses classified into a plurality of classes based on available bandwidth for the receiving apparatuses connected with a network, a packet comprising a receiver list showing the receiving apparatuses that belong to the classes in a header, adopts a configuration including: an available bandwidth estimating section that estimates the available bandwidth for a receiving apparatus from information related to transmission capability received from the receiving apparatus; a bandwidth correcting section that calculates a header size from numbers of receiving apparatuses that belong to the classes and corrects the available bandwidth based on a header size difference; and a class determination processing section that determines a class to which the receiving apparatus belongs, based on the corrected available bandwidth, and registers the receiving apparatus in the receiving list.

By this means, the transmitting apparatus predicts the influence of the number of receiving apparatuses in an upper class, so that it is possible to prevent the frequency of changing the transmission rate, that is, prevent a class which has an available bandwidth exceeding the transmission rate for the receiving apparatus changed to an upper class, from being lowered again.

Further, information related to transmission capability, which is acquired by the transmitting apparatus according to the present invention, includes a loss event rate measured by the receiving apparatus, a transmission time of the packet from the transmitting apparatus and an effective rate at which the receiving apparatus is able to receive the packet.

By this means, the transmitting apparatus is able to utilize a transmission rate controlling packet including information related to transmission capability based on the TFRC requirement.

Further, the available bandwidth estimating section of the transmitting apparatus according to the present invention estimates an available bandwidth further using a round-trip time determined from a time the packet is transmitted from the transmitting apparatus and a time a response packet is received from the receiving apparatus in response to the packet, a packet size and a timeout period of a retransmission timer according to a transmission control protocol.

By this means, the transmitting apparatus is able to utilize a technique for estimating the maximum transmission rate based on the TFRC requirement.

Further, the bandwidth correcting section of the transmitting apparatus according to the present invention finds an estimated bandwidth correcting variable from a header size for the class to which the receiving apparatus belongs and a header size for a class of a transmission rate one level higher than an original class, and corrects the available bandwidth estimated by the available bandwidth estimating section using the estimated bandwidth correcting variable.

By this means, the transmission rate for the receiving apparatus is determined by predicting the influence of the number of receiving apparatuses in a new class, so that it is possible to prevent changing once a class of the receiving apparatus to an upper class and, then, lowering again the class of the receiving apparatus where the transmission rate for the receiving apparatus exceeds the available bandwidth for the receiving apparatus.

Further, the class determination processing section of the transmitting apparatus according to the present invention compares effective rates for the classes, calculated from a maximum payload size and a header size for the classes, and the bandwidth corrected by the bandwidth correcting section, and classifies the receiving apparatus into a class of a maximum effective rate within a range of the corrected bandwidth.

By this means, it is possible to transmit data at the maximum effective rate among the available bandwidth for the receiving apparatus.

Further, the transmission rate controlling met hod according to the present invention for controlling a transmission rate of a packet to be transmitted to a receiving apparatus through a network, includes: receiving the packet including information related to transmission capability from the receiving apparatus; estimating an available bandwidth for the receiving apparatus for carrying out transmission, from the information related to transmission capability included in the received packet; classifying the receiving apparatus into a class based on the estimated available bandwidth; calculating header sizes for the classes from a number of receiving apparatuses that belong to the classified class and corrects the available bandwidth based on a header size difference; and determining the class to which the receiving apparatus belongs, based on the corrected available bandwidth.

Advantageous Effect of the Invention

According to the present invention, in communication according to the explicit multicast scheme employed in SICC, it is possible to transmit high quality multimedia data by reducing the frequency of changing the transmission rate.

EXPLANATION OF REFERENCE NUMERALS

Figure 1:
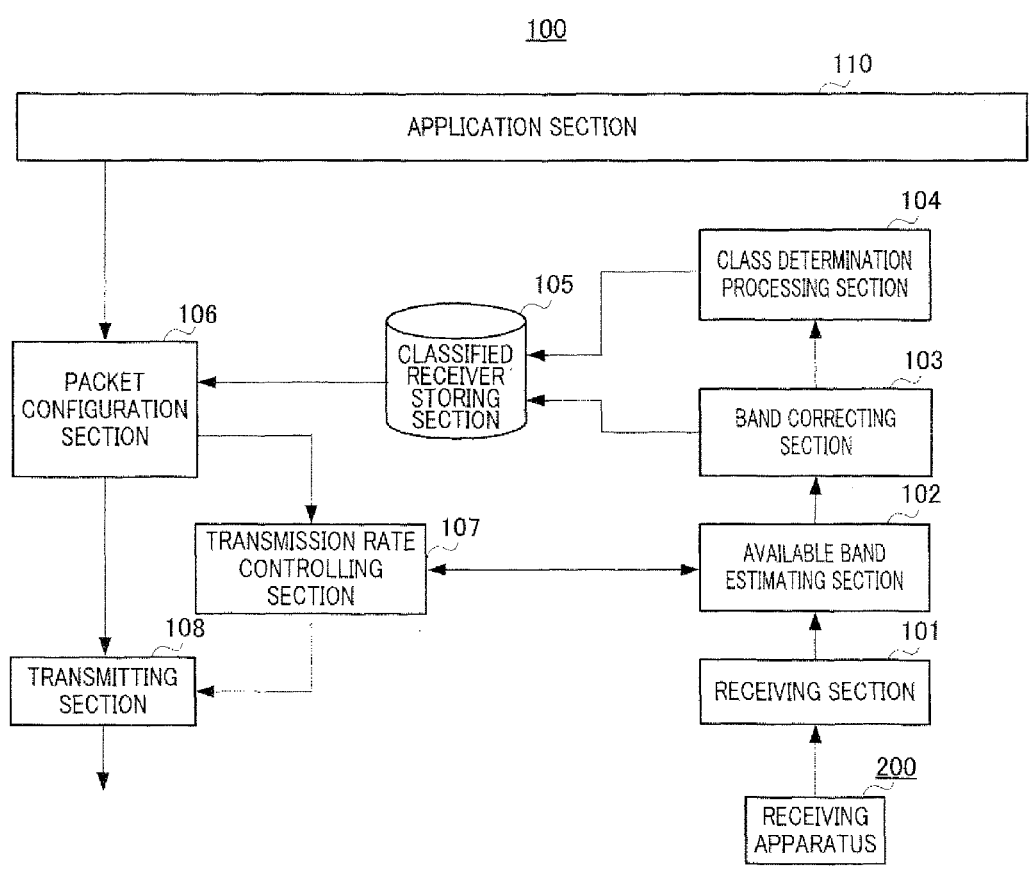
FIG. 1 shows a configuration example of the transmitting apparatus according to an embodiment of the present invention.

101 Receiving section
102 Available bandwidth estimating section
103 Bandwidth correcting section
104 Class determination processing section
105 Classified receiver storing section
106 Packet configuration section
107 Transmission rate controlling section
108 Transmitting section
110 Application section

BEST MODE FOR CARRYING OUT THE INVENTION

Hereinafter, the embodiment of the present invention will be described with reference to the accompanying drawings.

An example will be described with the embodiment of the present invention where XCAST 6 is used as the explicit multicast scheme. Further, a packet refers to the packet of XCAST 6.

FIG. 1 shows a configuration of the transmitting apparatus according to this embodiment.

Figure 2:
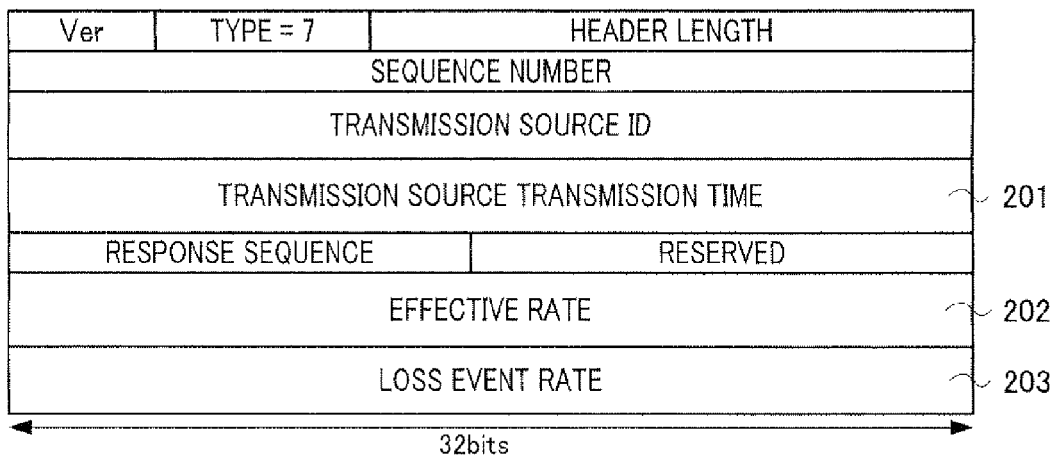
FIG. 2 shows a data format of a receiver report packet according to the embodiment of the present invention.

In FIG. 1, application section 110 executes an application in transmitting apparatus 100, and receiving section 101 receives a receiver report packet from, for example, receiving apparatus 200 and extracts feedback information. FIG. 2 shows the data format of this receiver report packet.

In FIG. 2, feedback information includes time 201 the packet is transmitted from the transmitting apparatus (hereinafter "transmission source transmission time"), effective rate 202 at which the receiver apparatus is able to receive the packet, and loss event rate 203 measured by the receiving apparatus.

Available bandwidth estimating section 102 estimates the available bandwidth for the receiving apparatus applying the bandwidth estimation scheme defined according to TFRC, to feedback information received from receiving section 101.

Bandwidth correcting section 103 finds a correcting coefficient by calculating the header size for each class and corrects the available bandwidth estimated at available bandwidth estimating section 102 using this correcting coefficient.

Class determination processing section 104 calculates the effective rate from the transmission rate specified in advance, and compares the effective rate with the bandwidth corrected at bandwidth correcting section 103. By this means, class determination processing section 104 determines the class to which the receiving apparatus belongs, and records the class in classified receiver storing section 105. In this embodiment, maximum transmission rate 1M (bps) is set for the transmitting apparatus. Three classes of class 1 to class 3 that set 512K (bps) and 256K (bps) as thresholds, are provided. Then, a receiver list is generated per class.

Packet configuration section 106 configures the packet header of the explicit multicast scheme and stores the receiver list in the routing header of this header. Further, content that is received from application section 110 and is to be transmitted to each receiving apparatus is recorded in the payload.

Transmission rate controlling section 107 controls the timing for transmitting a packet such that the time interval for transmitting the packet is controlled according to the class of the receiver list.

Transmitting section 108 transmits the packet at the timing specified by transmission rate controlling section 107.

Further, to transmit multimedia data at different transmission rates to each class, the transmitting apparatus generates a packet using data obtained by puncturing moving image frames in each class at packet configuration section 106. Then, transmitting section 108 transmits the packet at the transmission rate specified by transmission rate controlling section 107. For example, transmitting section 108 transmits all moving image frames to a receiving apparatus in 1 Mbps class and transmits a frame obtained by puncturing half of the frame for 1 Mbps class, to the 512 kbps class. Further, transmitting section 108 transmits a frame obtained by further puncturing half of the punctured frame, to the 256 Kbps class.

Furthermore, to transmit data with different frames to a receiving apparatus in each class, frame configuration section 106 employs a compression coding scheme where there is no dependence between frames, for example, Motion JPEG (Motion Joint Photographic ExPerts Group) or moving image data subjected to layer coding.

In this case, frame puncturing is carried out for each class before transmission and the number of frames is not changed during transmission.

Figure 3:
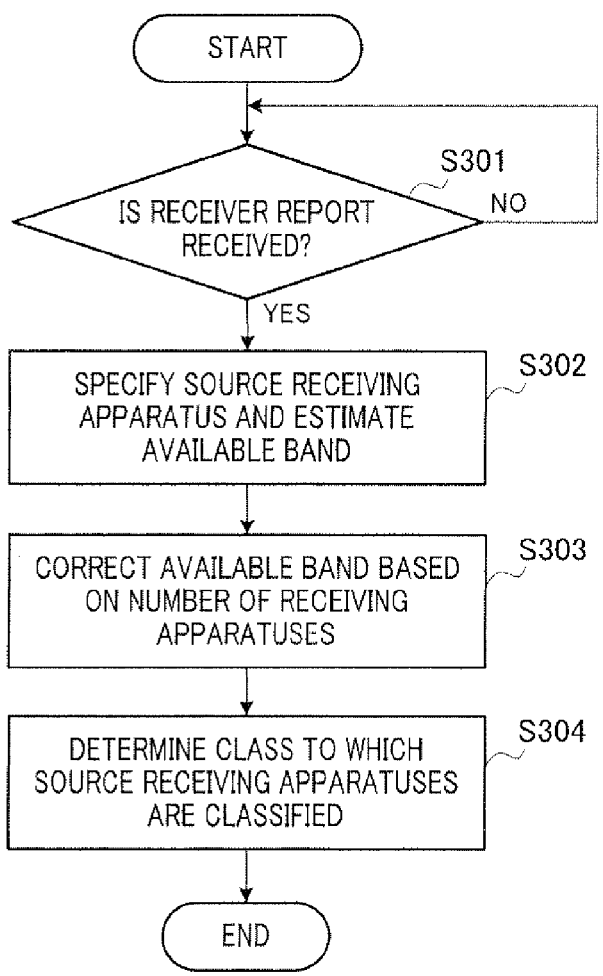
FIG. 3 shows transmission rate control processing of the transmitting apparatus according to the embodiment of the present invention.

Next, the operation and advantage of controlling the transmission rate by the transmitting apparatus according to this embodiment will be described in detail. FIG. 3 shows transmission rate control processing by the transmitting apparatus.

In FIG. 3, when receiving a packet from a receiving apparatus, receiving section 101 checks whether a receiver report is included (step S301).

When a receiver report is not included, receiving section 101 returns to stand-by mode.

On the other hand, when a receiver report is included, receiving section 101 reports feedback information with the address of each transmission source receiving apparatus, to receiver capability estimating section 202.

Upon reception of this report, available bandwidth estimating section 102 estimates the available bandwidth for the receiving apparatus based on above equation 1 specified according to TFRC (step S302). Then, available bandwidth estimating section 102 reports the estimated available bandwidth to bandwidth correcting section 103.

Here, available bandwidth estimating section 202 calculates packet size s for the class to which the receiving apparatus belongs, according to following equation 2.

$$s = No\_addr\_hdr + Addr\_size + Max\_plen \quad \text{(Equation 2)}$$

where No_addr_hdr is the header size not including the destination address list, Addr_size is the size of the destination address list and Max_plen is the maximum payload size of the packet. In XCAST 6, No_addr_size is formed with IPv6 header 601, XCAST header 604 not including the address list, and the UDP header. Further, in case of a unique protocol such as in SICC, the header unique to the protocol is further added to No_addr_size.

Further, round-trip time (round-trip transmission delay time) R is estimated according to following equation 3 and equation 4.

$$R\_sample = t\_now - t\_stamp - t\_delay \quad \text{(Equation 3)}$$

where R_sample is the latest response delay time, t_stamp is the transmission time of the packet transmitted by the transmitting apparatus, t_now is the current time and t_delay is the time the receiving apparatus takes to generate a feedback packet.

$$R = q \times R + (1-q) \times R\_sample \quad \text{Equation 4}$$

where $0 \leq q < 1$, and q is the value for determining to what extent information of a past response delay time is reflected.

The above equation shows that round-trip time R is determined by taking into account a past response delay time instead of by finding a response delay time from feedback information alone. If q is closer to 0, the latest response delay time determined using feedback information has a greater influence with respect to the overall response delay time, and, if q is closer to 1, information of a past response delay time has a greater influence with respect to the overall response delay time.

Timeout period T_RTO of TOP is determined from above R according to following equation 5.

$$T\_RTO = 4 \times R \quad \text{(Equation 5)}$$

Finally, the available bandwidth for the receiving apparatus is estimated based on equation 1.

Next, bandwidth correcting section 103 finds the header size for each class based on the number of receiving apparatuses in the current class to which the receiving apparatus belongs and the number of receiving apparatuses in an upper class after this receiving apparatus is added, and calculates estimated bandwidth correcting variable class_factor for correcting the bandwidth for the current class. Then, bandwidth correcting section 103 estimates the available bandwidth for the receiving apparatus in an upper class for which the header size difference is corrected, by using the available bandwidth for the current class estimated at available bandwidth estimating section 102, feedback information and class_factor (step S303).

Figure 4:
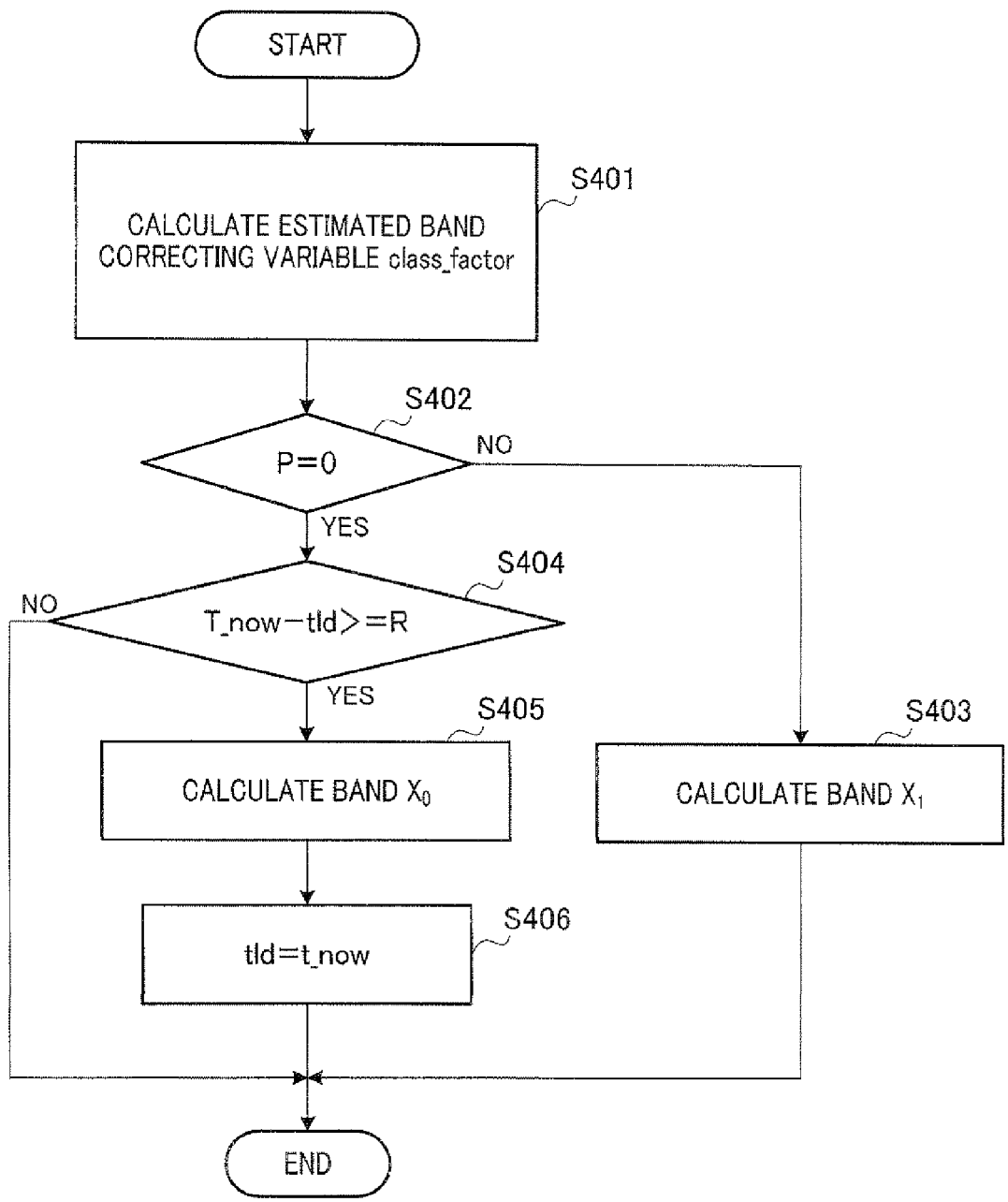
FIG. 4 shows bandwidth correction processing by a bandwidth correcting section of the transmitting apparatus according to the embodiment of the present invention.

FIG. 4 shows processing of correcting the available bandwidth at bandwidth correcting section 103.

First, bandwidth correcting section 103 finds estimated bandwidth correcting variable class_factor (step S401). For example, class_factor is calculated according to equation 6 using No_addr_hdr, which is the header size not including the size of the destination address list of the receiving apparatus, Max_plen, which is the maximum payload size, Upper_addr_size, which is the size of the destination address list of an upper class, and Current_addr_size, which is the size of the destination address list of the current class.

$$class\_factor = (No\_addr\_hdr + Upper\_addr\_size + Max\_plen) / (No\_addr\_hdr + Current\_addr\_size + Max\_plen) \quad \text{(Equation 6)}$$

Next, bandwidth correcting section 103 decides whether or not loss event rate p is "0" (step S402) and, if loss event rate p is not "0," calculates bandwidth $X_1$ according to equation 7 (step S403).

$$X_1 = \max(\min(X\_calc, 2 \times class\_factor \times X\_recv), s/t\_mbi) \quad \text{(Equation 7)}$$

where X_calc is the bandwidth calculated at the available bandwidth estimating section, X_recv is the bandwidth to be fed back where the receiving apparatus is able to actually receive a packet, s is the packet size and t_mbi is maximum RTT.

On the other hand, when loss event rate p is "0," bandwidth correcting section 103 decides whether or not the time that has passed (t_now−tld) between the time tld previous feedback information is received and current time t_now, is longer than round-trip time R (step S404), and if the time that has passed is not longer, finishes the processing.

On the other hand, if the time that has passed is longer, bandwidth correcting section 103 calculates bandwidth $X_0$ according to equation 8 (step S405).

$$X_0 = \max(\min(2 \times class\_factor \times X, 2 \times class\_factor \times X\_recv), s/R) \quad \text{(Equation 8)}$$

Next, bandwidth correcting section 103 updates tld to the current time (step S406).

As described above, after correcting the available bandwidth, bandwidth correcting section 103 reports the calculation result to class determination processing section 104.

Figure 5:
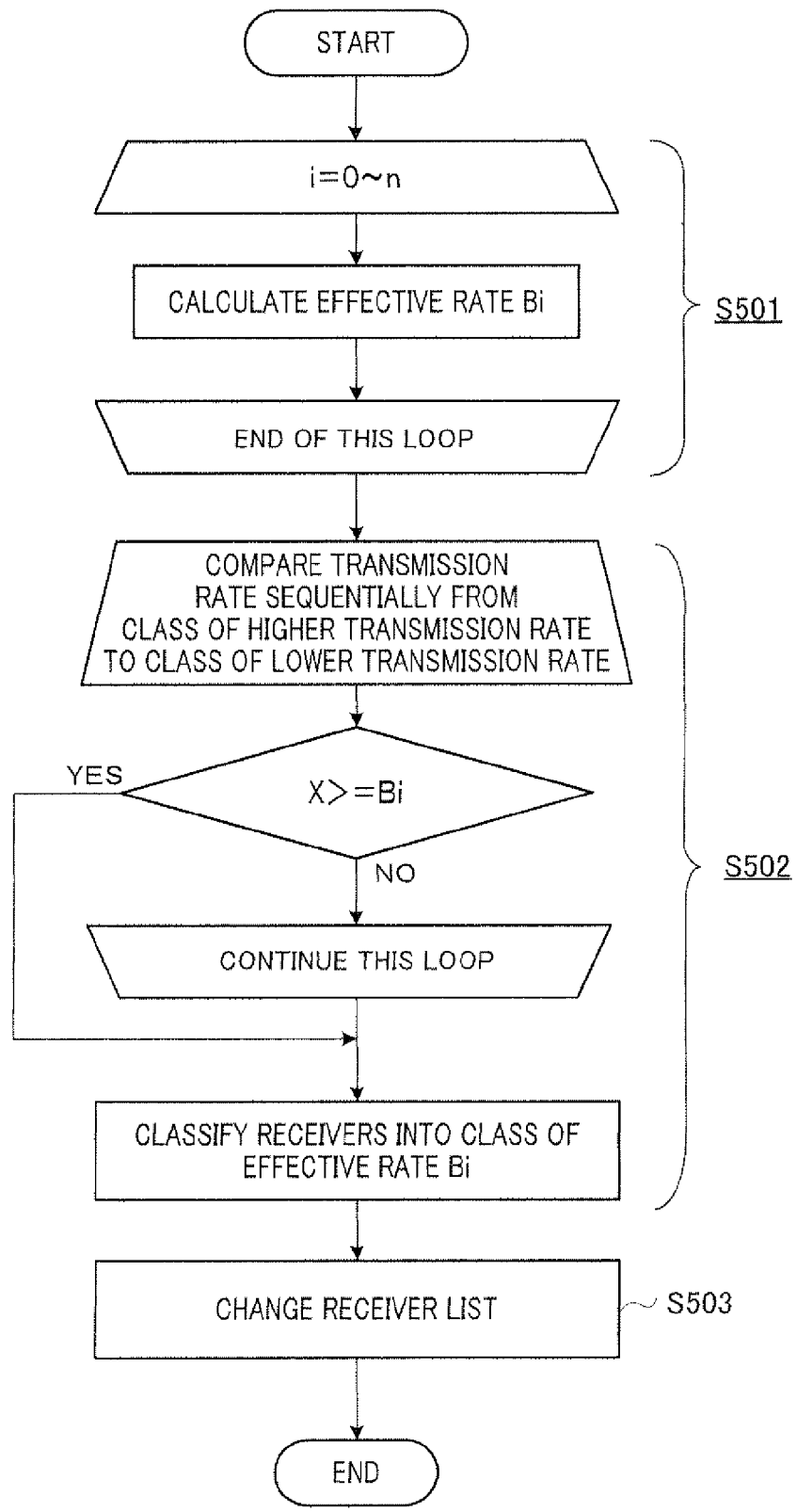
FIG. 5 shows classification processing by a class determination processing section of the transmitting apparatus according to the embodiment of the present invention.
Figure 6:
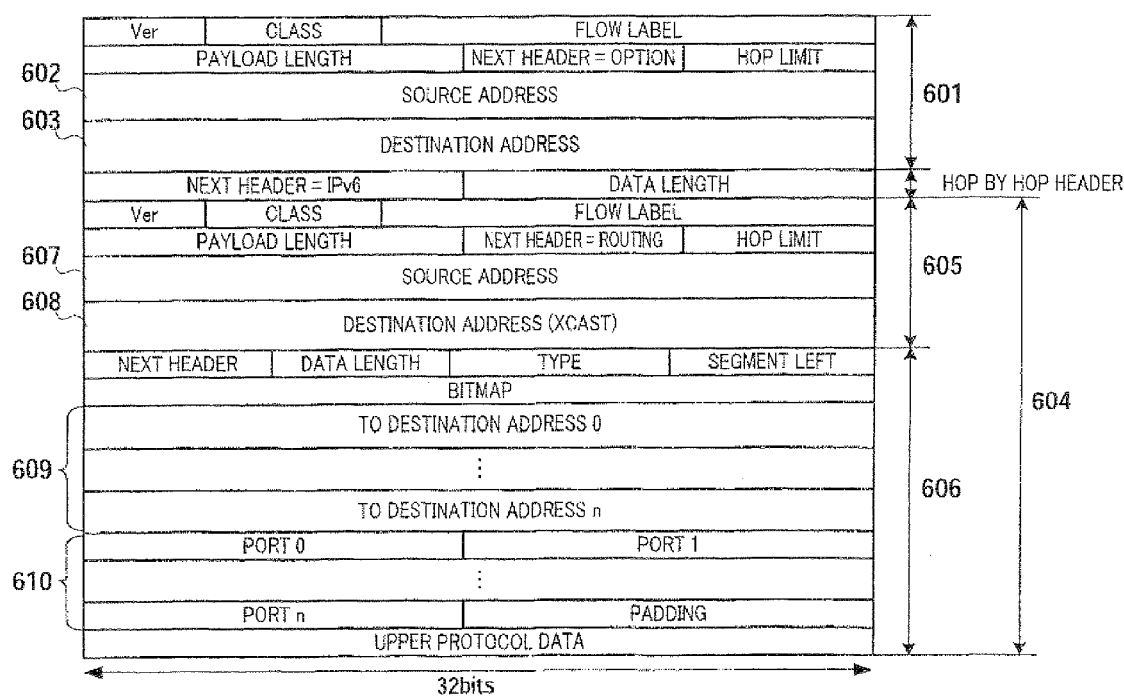
FIG. 6 shows a data format in conventional XCAST 6.
Figure 7:
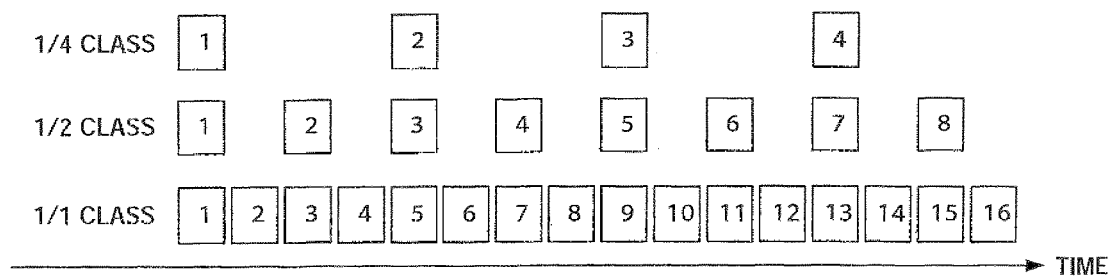
FIG. 7 is a packet delivery diagram showing conventional SICC operation.

Next, class determination processing section 104 determines to which class the receiving apparatus belongs, based on the corrected available bandwidth (step S304). FIG. 5 shows processing of determining a class by class determination processing section 104.

In FIG. 5, first, class determination processing section 104 calculates effective rate Bi for each class (step S501). For example, effective rate Bi for each class is calculated according to the following equation 9 using transmission rate Ci set on a per class basis, header size Hi for each class and Max_plen, which is the maximum payload size. Here, i varies between 0 and n, where n is the number of classes.

$$Bi = Ci \times (Hi + Max\_plen)/Max\_plen \quad \text{(Equation 9)}$$

Next, class determination processing section 104 compares available bandwidth X and effective rate Bi for each class sequentially from a class of a higher transmission rate to a class of a lower transmission rate, and classifies the receiving apparatus into the class of the highest transmission rate among classes that satisfy the condition where available bandwidth X is higher than effective rate Bi (step S502).

To be more specific, class determination processing section 104 searches for a class that satisfies the condition X>Bi, by repeatedly updating i between class 0 to class n. For example, assuming that the number of classes is three, the effective rate is 1 Mbps for class 0, 512 kbps for class 1, 256 kbps for class 2 and available bandwidth X is 600 kbps. In this case, to satisfy X>Bi, the receiving apparatus is classified into class 1.

Next, class determination processing section 104 changes the receiver list recorded in classified receiver storing section 105 such that the receiving apparatus belongs to the determined class (step S503).

As described above, the transmitting apparatus according to this embodiment corrects the available bandwidth determined based on feedback information using the header size difference between classes and determines to which class the receiving apparatus is classified, using the corrected bandwidth. By this means, in communication according to the explicit multicast scheme employed in SICC, even when a class of the receiving apparatus is changed to a new class, the change of the transmission rate in the new class due to the header size difference is corrected, and so the transmission rate does not exceed the available transmission rate for the receiving apparatus. For this reason, after changing the transmission rate for the receiving apparatus, the transmitting apparatus does not change the class to a lower class, so that it is possible to reduce the frequency of changing the transmission rate. As a result, the transmitting apparatus is able to transmit high quality multimedia data.

INDUSTRIAL APPLICABILITY

The present invention is useful for a transmitting apparatus that transmits data according to the explicit multicast scheme and reduces the frequency of changing the transmission rate of a packet.

The invention claimed is:

1. A transmitting apparatus for transmitting a packet to a plurality of receiving apparatuses through a network, the plurality of receiving apparatuses being classified into a plurality of classes based on an available bandwidth for the plurality of receiving apparatuses, the packet being transmitted on a per class basis and including, in a header, a receiver list in which one or more receiving apparatuses that belong to a class for transmitting the packet are registered, the transmitting apparatus comprising:
   a receiving section that receives the packet from a receiving apparatus, the packet further including information about a transmission capability of the receiving apparatus;
   an available bandwidth estimating section that estimates the available bandwidth for the receiving apparatus, from the information included in the received packet;
   a bandwidth correcting section that calculates a header size of each class from a number of receiving apparatuses that belong to each class, and corrects the available bandwidth based on a difference of the header size between each class; and
   a class determination processing section that determines a class to which the receiving apparatus belongs, based on the corrected available bandwidth, and registers the receiving apparatus in the receiver list, wherein the bandwidth correction section:
   calculates a bandwidth correcting coefficient for the available bandwidth, by calculating a packet size for the class that is formed with the calculated header size and a payload size for the class, and by dividing the packet size for the class by a packet size for an upper class; and
   corrects the available bandwidth by multiplying the available bandwidth with the calculated bandwidth correcting coefficient.

2. The transmitting apparatus according to claim 1, wherein the information includes a loss event rate measured by the receiving apparatus, a transmission time of the packet from the transmitting apparatus, and an effective rate at which the receiving apparatus is able to receive the packet.

3. The transmitting apparatus according to claim 2, wherein the available bandwidth estimating section estimates the available bandwidth by further using a round-trip time, a packet size, and a timeout period of a retransmission timer according to a transmission control protocol, the round-trip time being determined from a time the packet is transmitted from the transmitting apparatus and a time a response packet is received from the receiving apparatus in response to the packet.

4. The transmitting apparatus according to claim 1, wherein the class determination processing section compares an effective rate for each class with the corrected available bandwidth, the effective rate being calculated from a maximum payload size and the header size for each class, and classifies the receiving apparatus into a class of a maximum effective rate within a range of the corrected available bandwidth.

5. A transmission rate controlling method for controlling a transmission rate of a packet to be transmitted to a receiving apparatus through a network, the transmission rate controlling method comprising the steps of:

receiving the packet from the receiving apparatus, the packet including information about a transmission capability of the receiving apparatus;

estimating an available bandwidth for the receiving apparatus, from the information included in the received packet;

classifying the receiving apparatus into a class that is one of a plurality of classes obtained by classifying a plurality of receiving apparatuses, based on the estimated available bandwidth;

calculating a header size of each class from a number of receiving apparatuses that belong to each class;

correcting the available bandwidth based on a difference of the header size between each class; and determining a class to which the receiving apparatus belongs, based on the corrected available bandwidth, wherein:

a bandwidth correcting coefficient for the available bandwidth is calculated by calculating a packet size for the class that is formed with the calculated header size and a payload size for the class, and by dividing the packet size for the class by a packet size for an upper class; and the available bandwidth is corrected by multiplying the available bandwidth with the calculated bandwidth correcting coefficient.

6. The transmission rate controlling method according to claim 5, wherein the information includes a loss event rate measured by the receiving apparatus, a transmission time of the packet, and an effective rate at which the receiving apparatus is able to receive the packet.

7. The transmission rate controlling method according to claim 5, wherein the available bandwidth is estimated by further using a round trip time of the packet, a packet size, and a timeout period of a retransmission timer according to a transmission control protocol.

8. The transmission rate controlling method according to claim 5, wherein:

each class has an effective rate; and one of the classes is determined such that the effective rate of the class is maximized within a range of the corrected available bandwidth.

* * * * *